US011044350B1

(12) United States Patent
Duke et al.

(10) Patent No.: US 11,044,350 B1
(45) Date of Patent: Jun. 22, 2021

(54) METHODS FOR DYNAMICALLY MANAGING UTILIZATION OF NAGLE'S ALGORITHM IN TRANSMISSION CONTROL PROTOCOL (TCP) CONNECTIONS AND DEVICES THEREOF

(71) Applicant: F5 Networks, Inc., Seattle, WA (US)

(72) Inventors: Martin Huynh Duke, Seattle, WA (US); Nasif Ekiz, Seattle, WA (US); Saxon Amdahl, San Jose, CA (US); Nicholas Alexander Pulera, Seattle, WA (US)

(73) Assignee: F5 NETWORKS, INC., Seattle, WA (US)

( * ) Notice: Subject to any disclaimer, the term of this patent is extended or adjusted under 35 U.S.C. 154(b) by 12 days.

(21) Appl. No.: 16/268,176

(22) Filed: Feb. 5, 2019

Related U.S. Application Data

(60) Provisional application No. 62/627,352, filed on Feb. 7, 2018.

(51) Int. Cl.
*H04L 12/70* (2013.01)
*H04L 29/06* (2006.01)
(Continued)

(52) U.S. Cl.
CPC ........ *H04L 69/163* (2013.01); *H04L 43/0864* (2013.01); *H04L 47/193* (2013.01); *H04L 47/365* (2013.01); *H04L 69/166* (2013.01)

(58) Field of Classification Search
CPC . H04L 69/163; H04L 43/0864; H04L 47/193; H04L 69/166; H04L 47/365
(Continued)

(56) References Cited

U.S. PATENT DOCUMENTS

| 8,559,313 B1 * | 10/2013 | Mukerji | H04L 69/321 370/235 |
| 2008/0183888 A1 * | 7/2008 | Brown | H04L 69/163 709/235 |

(Continued)

OTHER PUBLICATIONS

F5 Networks, Inc., "BIG-IP® Local Traffic Management: Basics", Manual, May 9, 2016, 58 pages, version 12.1, F5 Networks, Inc.
(Continued)

*Primary Examiner* — Moustafa M Meky
*Assistant Examiner* — Elizabeth Kassa
(74) *Attorney, Agent, or Firm* — Troutman Pepper Hamilton Sanders LLP (Rochester)

(57) ABSTRACT

Methods, non-transitory computer readable media, network traffic management apparatuses, and network traffic management systems that monitor at least one TCP connection. A determination is made when an established configuration for the TCP connection requires modification based on the monitoring. The established configuration corresponds to utilization of Nagle's algorithm for the TCP connection. The established configuration is automatically modified to enable or disable utilization of Nagle's algorithm for the TCP connection, when the determination indicates that the established configuration requires modification. By automatically toggling utilization of Nagle's algorithm for a TCP connection, the TCP connection can advantageously be dynamically optimized with this technology with respect to performance metrics such as latency and bandwidth efficiency.

20 Claims, 4 Drawing Sheets

(51) Int. Cl.
*H04L 12/26* (2006.01)
*H04L 12/805* (2013.01)
*H04L 12/801* (2013.01)

(58) Field of Classification Search
USPC .......................................................... 709/233
See application file for complete search history.

(56) References Cited

U.S. PATENT DOCUMENTS

| | | | |
|---|---|---|---|
| 2008/0298233 A1* | 12/2008 | Arora ................... | H04L 1/1664 370/229 |
| 2009/0185497 A1* | 7/2009 | Arora ................... | H04L 47/323 370/248 |
| 2010/0103819 A1* | 4/2010 | Samuels ............. | H04L 67/2876 370/235 |
| 2014/0143308 A1* | 5/2014 | Tychina ................. | H04L 67/28 709/203 |

OTHER PUBLICATIONS

F5 Networks, Inc., "F5 BIG-IP TMOS: Operations Guide", Manual, Dec. 2018, 226 pages, F5 Networks, Inc.

F5 Networks, Inc., "BIG-IP® Local Traffic Manager™: Implementations", Manual, May 4, 2018, 228 pages, version 12.1, F5 Networks, Inc.

F5 Networks, Inc., "BIG-IP@ TMOS:® Implementations", Manual, May 9, 2016, 184 pages, version 12.1, F5 Networks, Inc.

* cited by examiner

METHODS FOR DYNAMICALLY MANAGING UTILIZATION OF NAGLE'S ALGORITHM IN TRANSMISSION CONTROL PROTOCOL (TCP) CONNECTIONS AND DEVICES THEREOF

This application claims the benefit of U.S. Provisional Patent Application Ser. No. 62/627,352 filed Feb. 7, 2018, which is hereby incorporated by reference in its entirety.

FIELD

This technology generally relates to managing network traffic and, more specifically, to methods and devices for dynamically managing utilization of Nagle's algorithm in transmission control protocol (TCP) connections.

BACKGROUND

Nagle's algorithm, which is disclosed in Request for Comments (RFC) No. 896 entitled "Congestion Control in IP/TCP Internetworks," by John Nagle, published on Jan. 6, 1984, and is incorporated herein by reference in its entirety, generally disallows Transmission Control Protocol (TCP) sending devices from sending sub-maximum-size packets unless all sent data has been acknowledged. The maximum size used in many implementations of Nagle's algorithm is a maximum segment size (MSS) established for a TCP connection, although other maximum sizes can also be used. By delaying the sending of sub-maximum-size packets, more time is available for application data to arrive from another network protocol layer (e.g., a HyperText Transfer Protocol (HTTP) layer) in the network stack. The additional application data can then be aggregated into a larger or full size packet, thereby reducing the number of relatively small packets that are transmitted.

However, enabling utilization of Nagle's algorithm for a TCP connection introduces latency. More specifically, at the end of a message, a sending device will wait for all sent data to be acknowledged in order to send the remaining application data rather than send the remaining application data earlier in a packet that is less than a maximize size for the TCP connection. However, disabling utilization of Nagle's algorithm results in sending an increased number of packets, thereby reducing bandwidth efficiency and causing receiving devices to expend an increased amount of energy (e.g., battery power) to receive packets and transmit acknowledgements.

Currently, utilization of Nagle's algorithm is ineffective and/or inefficient in many network stack implementations. In particular, network devices often either enable or disable utilization Nagle's algorithm for all TCP connections irrespective of whether only a subset of the TCP connections would benefit from, or be harmed by, implementing Nagle's algorithm. Accordingly, many networks have increased latency and/or inefficient bandwidth utilization for TCP communications, and/or cause increased power consumption for receiving devices, which is undesirable.

SUMMARY

A method for dynamically managing utilization of Nagle's algorithm in transmission control protocol (TCP) connections implemented in cooperation with a network traffic management system comprising one or more network traffic management modules, server modules, or client modules, includes monitoring at least one TCP connection. A determination is made when an established configuration for the TCP connection requires modification based on the monitoring. The established configuration corresponds to utilization of Nagle's algorithm for the TCP connection. The established configuration is automatically modified to enable or disable utilization of Nagle's algorithm for the TCP connection, when the determination indicates that the established configuration requires modification.

A network traffic management apparatus is disclosed that includes memory including programmed instructions stored thereon and one or more processors configured to be capable of executing the stored programmed instructions to monitor at least one TCP connection. A determination is made when an established configuration for the TCP connection requires modification based on the monitoring. The established configuration corresponds to utilization of Nagle's algorithm for the TCP connection. The established configuration is automatically modified to enable or disable utilization of Nagle's algorithm for the TCP connection, when the determination indicates that the established configuration requires modification.

A non-transitory computer readable medium having stored thereon instructions for dynamically managing utilization of Nagle's algorithm in TCP connections including executable code that, when executed by one or more processors, causes the processors to monitor at least one TCP connection. A determination is made when an established configuration for the TCP connection requires modification based on the monitoring. The established configuration corresponds to utilization of Nagle's algorithm for the TCP connection. The established configuration is automatically modified to enable or disable utilization of Nagle's algorithm for the TCP connection, when the determination indicates that the established configuration requires modification.

A network traffic management system includes one or more network traffic management modules, server modules, or client modules, memory comprising programmed instructions stored thereon, and one or more processors configured to be capable of executing the stored programmed instructions to monitor at least one TCP connection. A determination is made when an established configuration for the TCP connection requires modification based on the monitoring. The established configuration corresponds to utilization of Nagle's algorithm for the TCP connection. The established configuration is automatically modified to enable or disable utilization of Nagle's algorithm for the TCP connection, when the determination indicates that the established configuration requires modification.

This technology has a number of associated advantages including providing methods, non-transitory computer readable media, network traffic management apparatuses, and network traffic management systems that monitor TCP connections and automatically toggle utilization of Nagle's algorithm for the TCP connections based on the monitoring in order to optimize the TCP connections. In particular, this technology optimizes TCP connections by reducing latency and improving bandwidth utilization, among other advantages.

DETAILED DESCRIPTION

Figure 1:
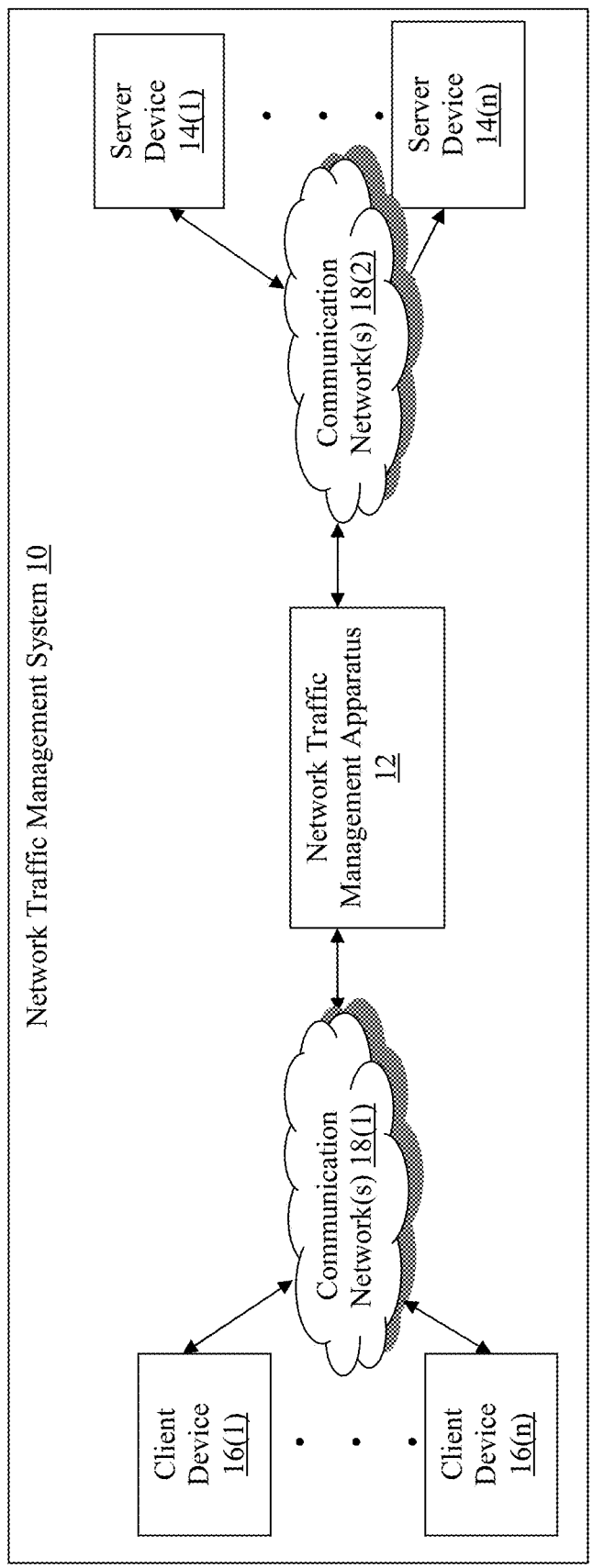
FIG. 1 is a block diagram of an exemplary network traffic management system with a network traffic management apparatus.

Referring to FIG. 1, an exemplary network environment that incorporates an exemplary network traffic management system 10 is illustrated. The network traffic management system 10 in this example includes a network traffic management apparatus 12 that is coupled to server devices 14(1)-14(n), and client devices 16(1)-16(n) via communication network(s) 18(1) and 18(2), although the network traffic management apparatus 12, server devices 14(1)-14(n), and client devices 16(1)-16(n) may be coupled together via other topologies. The network traffic management system 10 may include other network devices such as one or more routers or switches, for example, which are known in the art and thus will not be described herein. This technology provides a number of advantages including methods, non-transitory computer readable media, network traffic management systems, and network traffic management apparatuses that improve utilization of Nagle's algorithm for TCP connections to thereby reduce latency of TCP communications, improve network bandwidth utilization, and improve power consumption of network devices.

In this particular example, the network traffic management apparatus 12, server devices 14(1)-14(n), and client devices 16(1)-16(n) are disclosed in FIG. 1 as dedicated hardware devices. However, one or more of the network traffic management apparatus 12, server devices 14(1)-14(n), or client devices 16(1)-16(n) can also be implemented in software within one or more other devices in the network traffic management system 10. As used herein, the term "module" refers to either an implementation as a dedicated hardware device or apparatus, or an implementation in software hosted by another hardware device or apparatus that may be hosting one or more other software components or implementations.

As one example, the network traffic management apparatus 12, as well as any of its components or applications, can be a module implemented as software executing on one of the server devices 14(1)-14(n), and many other permutations and types of implementations can also be used in other examples. Moreover, any or all of the network traffic management apparatus 12, server devices 14(1)-14(n), or client devices 16(1)-16(n) can be implemented, and may be referred to herein, as a module.

Figure 2:
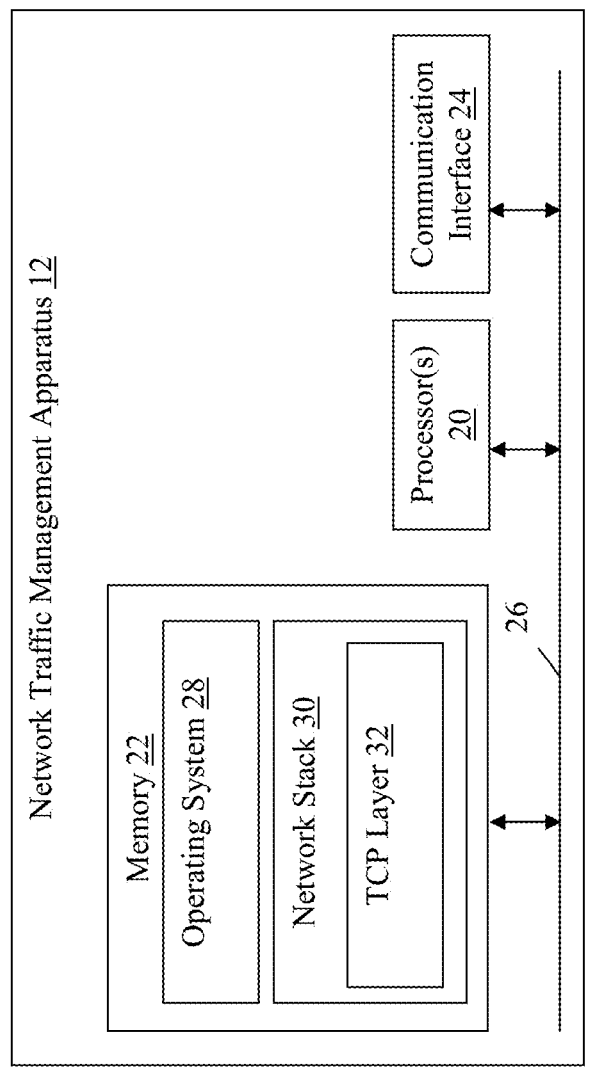
FIG. 2 is a block diagram of an exemplary network traffic management apparatus.

Referring to FIGS. 1-2, the network traffic management apparatus 12 of the network traffic management system 10 may perform any number of functions, including providing network security, load balancing network traffic across the server devices 14(1)-14(n), or accelerating network traffic associated with applications hosted by one or more of the server devices 14(1)-14(n), for example. The network traffic management apparatus 12 in this example includes one or more processor(s) 20, a memory 22, and a communication interface 24, which are coupled together by a bus 26, although the network traffic management apparatus 12 can include other types or numbers of elements in other configurations.

The processor(s) 20 of the network traffic management apparatus 12 may execute programmed instructions stored in the memory 22 of the network traffic management apparatus 12 for any number of the functions identified above. The processor(s) 20 of the network traffic management apparatus 12 may include one or more central processing units (CPUs) or general purpose processors with one or more processing cores, for example, although other types of processor(s) can also be used.

The memory 22 of the network traffic management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Figure 3:
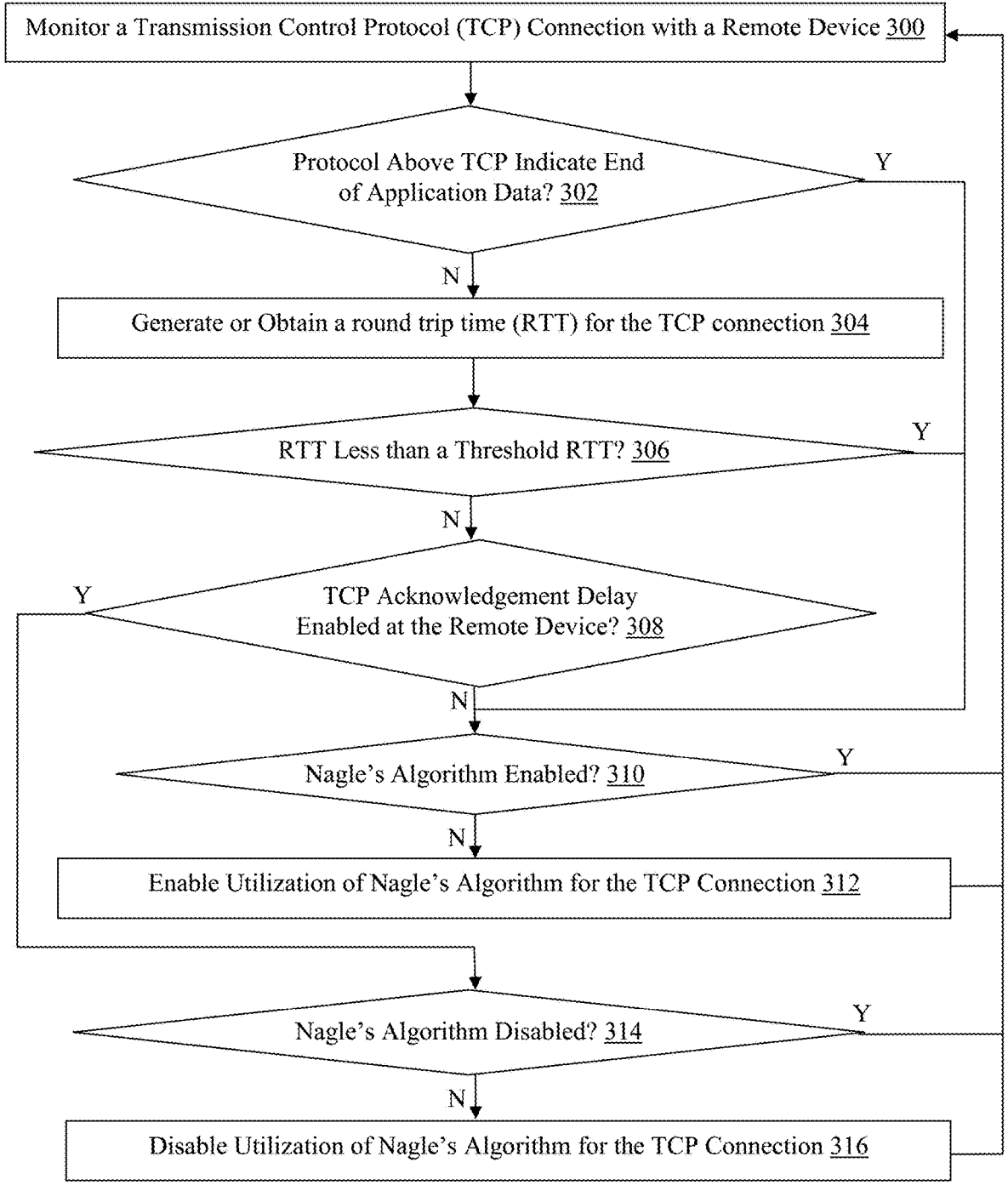
FIG. 3 is a flowchart of an exemplary method for automatically toggling utilization of Nagle's algorithm for transmission control protocol (TCP connections.

Accordingly, the memory 22 of the network traffic management apparatus 12 can store one or more applications that can include computer executable instructions that, when executed by the network traffic management apparatus 12, cause the network traffic management apparatus 12 to perform actions, such as to transmit, receive, or otherwise process messages, for example, and to perform other actions described and illustrated below with reference to FIGS. 3-4. The application(s) can be implemented as components of other applications. Further, the application(s) can be implemented as operating system extensions, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus 12 itself, may be located in virtual server(s) running in a cloud-based computing environment rather than being tied to one or more specific physical network computing devices. Also, the application(s) may be running in one or more virtual machines (VMs) executing on the network traffic management apparatus 12. Additionally, in one or more examples of this technology, virtual machine(s) running on the network traffic management apparatus 12 may be managed or supervised by a hypervisor.

In this particular example, the memory 22 of the network traffic management apparatus 12 includes an operating system 28 and a network stack 30 with a TCP layer 32, although the memory can include other policies, modules, databases, or applications, for example. The operating system 28 can execute applications and control the general operation and other tasks performed by the network traffic management apparatus 12, for example. In one example, the operating system can be a traffic management microkernel (TMM) provided by F5 Networks, Inc. of Seattle, Wash., although other types of operating systems can also be used in other examples.

The operating system 28 and/or other applications executed by the network traffic management apparatus 12 can generate application data that is communicated to an upper layer or module of the network stack 30 to subsequently be packetized by the TCP layer 32 and sent to a remote device, such as one of the client devices 16(1)-16(n) or one of the server devices 14(1)-14(n). In addition to the TCP layer 32, the network stack 30 can include a plurality of other layers or modules configured to communicate between each other in order to facilitate the transmission of data across the communication network(s) 18(1) and/or 18(2), for example. Accordingly, the network stack 30, also referred to as a protocol stack, includes software implementations for a plurality of network communication protocols.

In this particular example in which the network traffic management apparatus 12 acts as a proxy between the server devices 14(1)-14(n) and the client devices 16(1)-16(n), the network traffic management apparatus 12 may be receive packets from the server devices 14(1)-14(n) with data contained therein, process the packets using the operating system 28, and generate and send new packets to the client devices 16(1)-16(n) in order to communicate the data to the client devices 16(1)-16(n). In other examples, the packets may be received by the network traffic management apparatus 12 from the client devices 16(1)-16(n) and proxied to the server devices 14(1)-14(n), and other arrangements are also possible in other examples.

The TCP layer 32 in particular may receive application data from a higher or upper layer of the network stack 30 (e.g., an HTTP layer), which is then packetized. The TCP layer 32 with this technology advantageously automatically and dynamically optimizes utilization of Nagle's algorithm for TCP connections based on monitored messages received from another layer in the network stack 30, round trip time (RTT) of TCP packets for a TCP connection, and/or TCP acknowledgements received from a remote device associated with a TCP connection, as described and illustrated in more detail later with reference to FIGS. 3-4.

The communication interface 24 of the network traffic management apparatus 12 operatively couples and communicates between the network traffic management apparatus 12, server devices 14(1)-14(n), and client devices 16(1)-16(n), which are coupled together at least in part by the communication network(s) 18(1) and 18(2), although other types or numbers of communication networks or systems with other types or numbers of connections or configurations to other devices or elements can also be used.

By way of example only, the communication network(s) 18(1) and 18(2) can include local area network(s) (LAN(s)) or wide area network(s) (WAN(s)), and can use TCP/IP over Ethernet and industry-standard protocols, although other types or numbers of protocols or communication networks can be used. The communication network(s) 18(1) and 18(2) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. While packetized networks are disclosed in the examples herein, other types of the communication network(s) 18(1) and 18(2) can also be used in other examples.

While the network traffic management apparatus 12 is illustrated in this example as including a single device, the network traffic management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus 12.

Additionally, one or more of the devices that together comprise the network traffic management apparatus 12 in other examples can be standalone devices or integrated with one or more other devices or apparatuses, such as one or more of the server devices 14(1)-14(n), for example. Moreover, one or more of the devices of the network traffic management apparatus 12 in these examples can be in a same or a different communication network including one or more public, private, or cloud networks, for example.

Each of the server devices 14(1)-14(n) of the network traffic management system 10 in this example includes processor(s), a memory, and a communication interface, which are coupled together by a bus or other communication link, although other numbers or types of components could be used. The server devices 14(1)-14(n) in this example can include application servers, database servers, access control servers, or encryption servers, for example, that exchange communications along communication paths expected based on application logic in order to facilitate interactions with an application by users of the client devices 16(1)-16(n).

Accordingly, in some examples, one or more of the server devices 14(1)-14(n) process login and other requests received from the client devices 16(1)-16(n) via the communication network(s) 18(1) and 18(2) according to the HTTP-based application RFC protocol, for example. A web application may be operating on one or more of the server devices 14(1)-14(n) and transmitting data (e.g., files or web pages) to the client devices 16(1)-16(n) (e.g., via the network traffic management apparatus 12) in response to requests from the client devices 16(1)-16(n). The server devices 14(1)-14(n) may be hardware or software or may represent a system with multiple servers in a pool, which may include internal or external networks.

Although the server devices 14(1)-14(n) are illustrated as single devices, one or more actions of each of the server devices 14(1)-14(n) may be distributed across one or more distinct network computing devices that together comprise one or more of the server devices 14(1)-14(n). Moreover, the server devices 14(1)-14(n) are not limited to a particular configuration. Thus, the server devices 14(1)-14(n) may contain network computing devices that operate using a master/slave approach, whereby one of the network computing devices of the server devices 14(1)-14(n) operate to manage or otherwise coordinate operations of the other network computing devices. The server devices 14(1)-14(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 14(1)-14(n) can operate within the network traffic management apparatus 12 itself rather than as a stand-alone server device communicating with the network traffic management apparatus 12 via communication network(s) 18(2). In this example, the one or more of the server devices 14(1)-14(n) operate within the memory 22 of the network traffic management apparatus 12.

The client devices 16(1)-16(n) of the network traffic management system 10 in this example include any type of computing device that can exchange network data, such as mobile, desktop, laptop, or tablet computing devices, virtual machines (including cloud-based computers), or the like. Each of the client devices 16(1)-16(n) in this example includes a processor, a memory, and a communication interface, which are coupled together by a bus or other communication link (not illustrated), although other numbers or types of components could also be used.

The client devices 16(1)-16(n) may run interface applications, such as standard web browsers or standalone client applications, which may provide an interface to make requests for, and receive content stored on, one or more of the server devices 14(1)-14(n) via the communication network(s) 18(1) and 18(2). The client devices 16(1)-16(n) may further include a display device, such as a display screen or touchscreen, or an input device, such as a keyboard for example (not illustrated). Additionally, one or more of the client devices 16(1)-16(n) can be configured to execute software code (e.g., JavaScript code within a web browser) in order to log client-side data and provide the logged data to the network traffic management apparatus 12, as described and illustrated in more detail later.

Although the exemplary network traffic management system 10 with the network traffic management apparatus 12, server devices 14(1)-14(n), client devices 16(1)-16(n), and communication network(s) 18(1) and 18(2) are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network security system 10, such as the network traffic management apparatus 12, server devices 14(1)-14(n), or client devices 16(1)-16(n), for example, may be configured to operate as virtual instances on the same physical machine. In other words, one or more of the network traffic management apparatus 12, server devices 14(1)-14(n), or client devices 16(1)-16(n) may operate on the same physical device rather than as separate devices communicating through communication network(s) 18(1) or 18(2). Additionally, there may be more or fewer network traffic management apparatuses, client devices, or server devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

The examples may also be embodied as one or more non-transitory computer readable media having instructions stored thereon, such as in the memory 22, for one or more aspects of the present technology, as described and illustrated by way of the examples herein. The instructions in some examples include executable code that, when executed by one or more processors, such as the processor(s) 20, cause the processors to carry out steps necessary to implement the methods of the examples of this technology that are described and illustrated herein.

An exemplary method of dynamically managing utilization of Nagle's algorithm in TCP connections will now be described with reference to FIGS. 1-4. Referring more specifically to FIG. 3, an example of a method of automatically toggling utilization of Nagle's algorithm for TCP connections is illustrated. In step 300 in this example, the network traffic management apparatus 12 of the network traffic management system 10 monitors at least one TCP connection with a remote device, such as one of the client devices 16(1)-16(n), for example. The monitoring can be of characteristics or parameters that indicate that the established configuration for the TCP connection requires modification with respect to utilization of Nagle's algorithm, examples of which are described and illustrated herein with reference to steps 302, 306, and 310 of FIG. 3.

In step 302, the network traffic management apparatus 12 determines whether a network protocol layer or module above the TCP layer 32 in the network stack 30 is configured to communicate message(s) indicating an end of the transmission of application data. The determination in step 302 can be based on monitoring, in step 300, messages received by the TCP layer 32 from the network protocol layer above the TCP layer 32, for example, although other methods for determining whether the network protocol layer above the TCP layer 32 is configured to communicate message(s) indicating an end of the transmission of application data can also be used.

In one example, an HTTP protocol layer is above the TCP layer 32 in the network stack 30 and configured to communicate application data and end of application data messages to the TCP layer 32, although other network protocol layers can also exist in the network stack 30 (e.g., Secure Sockets Layer (SSL)) and be configured to communicate message(s) indicating an end of the transmission of application data in other examples. If the network traffic management apparatus 12 determines that a network protocol layer above the TCP layer 32 in the network stack 30 is not configured to communicate message(s) indicating an end of the transmission of application data, then the No branch is taken to step 304.

In step 304, the network traffic management apparatus 12 generates, or obtains from the memory 22, an RTT for the TCP connection. The implementation of the TCP layer 32 in this example is configured to maintain performance metrics for the TCP connection, including RTT, based on sent TCP packets and received acknowledgements monitored in step 300. Accordingly, the RTT can be a current or average RTT and can be generated dynamically or periodically and stored in the memory 22, for example, and other methods for generating or obtaining the RTT can also be used in other examples.

In step 306, the network traffic management apparatus 12 determines whether the RTT is less than a threshold RTT. The threshold RTT can be configurable by an administrator or dynamically generated based on the monitoring of one or more TCP connections managed by the network traffic management apparatus 12, for example. In some examples, the threshold RTT can be around 20 ms, although any other threshold RTT can be used. If the network traffic management apparatus 12 determines that the RTT is not less than the threshold RTT, then the No branch is taken to step 308.

In step 308, the network traffic management apparatus 12 determines whether TCP acknowledgement delay is enabled at the one of the client devices 16(1)-16(n). The determination in step 308 can be based on monitoring sequence numbers of one or more acknowledgement packets received from the one of the client devices 16(1)-16(n). If TCP acknowledgement delay is enabled, then the one of the client devices 16(1)-16(n) will not send an acknowledgement packet for each TCP packet sent by the network traffic management apparatus 12. Instead, the one of the client devices 16(1)-16(n) will send an acknowledgement packet subsequent to receiving several sent TCP packets.

When an acknowledgement packet is eventually sent by the one of the client devices 16(1)-16(n), it will only include a sequence number of a most or relatively recent sent TCP packet. When the TCP layer 32 receives the acknowledgement message, it will consider all TCP packets with lower sequence numbers to be acknowledged as well. Accordingly, if the network traffic management apparatus 12 determines, based on the monitoring in step 300, that an acknowledgement message is not received for each sequence number corresponding to a sent TCP packet, then the network traffic management apparatus 12 will determine in step 308 that TCP acknowledgement delay is enabled at the one of the client devices 16(1)-16(n). Other methods of determining whether TCP acknowledgement delay is enabled at a remote device can also be used in other examples.

If the network traffic management apparatus 12 determines that: TCP acknowledgement delay is not enabled in step 308 and the No branch is taken; a network protocol layer higher than or above the TCP layer 32 in the network stack 30 is configured to communicate message(s) indicating an end of the transmission of application data and the Yes branch is taken from step 302; or the RTT is less than the threshold RTT and the Yes branch is taken from step 306; then the network traffic management apparatus proceeds to step 310.

In step 310, the network traffic management apparatus 12 determines whether utilization of Nagle's algorithm is currently enabled for the TCP connection. Nagle's algorithm could be enabled based on a default configuration, for example. If the network traffic management apparatus 12 determines that utilization of Nagle's algorithm is enabled, then the Yes branch is taken back to step 300, and Nagle's algorithm will remain enabled for the TCP connection. However, if the network traffic management apparatus 12 determines in step 310 that utilization of Nagle's algorithm is not enabled for the TCP connection, then the No branch is taken to step 312.

In step 312, the network traffic management apparatus 12 modifies a configuration for the TCP connection to enable utilization of Nagle's algorithm. Subsequent to enabling Nagle's algorithm, the network traffic management apparatus 12 proceeds back to step 300.

Accordingly, in this example, Nagle's algorithm is enabled for a TCP connection in which the network protocol layer directly above the TCP layer 32 in the network stack 30 is configured to communicate a message to the TCP layer 32 indicating an end of application data. Because the TCP layer 32 is able to determine from the higher network protocol layer that no more application data is forthcoming, stalls when waiting for nonexistent future data can be prevented. In other words, the impact of utilization of Nagle's algorithm on latency can be reduced because the TCP layer 32 can independently determine that no more application data will be received, and will therefore not have to wait for all acknowledgements when a packet of sub-maximum-size is the last packet remaining in the send buffer.

With respect to RTT, utilization of Nagle's algorithm for a TCP connection can be enabled in this example when the RTT is low enough (i.e., below the RTT threshold) such that increased latency resulting from utilization of Nagle's algorithm can be tolerated in order to obtain the benefits of the algorithm (e.g., increased bandwidth efficiency and reduced power consumption).

Additionally, waiting for delayed acknowledgement messages in order to send sub-maximum-size packets can introduce significant latency that may not be tolerable. Accordingly, if TCP acknowledgement delay is not enabled at the one of the client devices 16(1)-16(n), and the one of the client devices 16(1)-16(n) is sending an acknowledgement packet for each sent TCP packet, then the impact on latency of utilization of Nagle's algorithm for the TCP connection will be less significant. Referring back to step 308, if the network traffic management apparatus 12 determines that TCP acknowledgement delay is enabled at the one of the client devices 16(1)-16(n), then the Yes branch is taken to step 314.

In step 314, the network traffic management apparatus 12 determines whether utilization of Nagle's algorithm is currently disabled for the TCP connection, such as due to an initial or default configuration, for example. If the network traffic management apparatus 12 determines that Nagle's algorithm is currently disabled for the TCP connection, then the Yes branch is taken back to step 300 and utilization of Nagle's algorithm remains disabled for the TCP connection. However, if the network traffic management apparatus 12 determines that Nagle's algorithm is not currently disabled for the TCP connection, then the No branch is taken to step 316.

In step 316, the network traffic management apparatus 12 modifies a configuration for the TCP connection to disable utilization of Nagle's algorithm. Subsequent to disabling Nagle's algorithm, the network traffic management apparatus proceeds back to step 300. Accordingly, in this example, utilization of Nagle's algorithm is disabled for a TCP connection because utilization of Nagle's algorithm would introduce significant latency as a result of waiting for delayed acknowledgements in order to send packets of a sub-maximum-size.

In other examples, one or more of steps 302-316, and in particular one or more of steps 302, 306, and/or 308, can be performed in a different order. Accordingly, in one particular example, Nagle's algorithm can be disabled for a TCP connection when RTT is not determined to be less than a threshold RTT without determining, and irrespective of, whether TCP acknowledgement delay is enabled at a remote device. As a result, the particular method disclosed in FIG. 3 is merely illustrative of exemplary characteristics or parameters of TCP connections that can be monitored in order to dynamically determine whether an established configuration for a TCP connection requires modification with respect to utilization of Nagle's algorithm.

Figure 4:
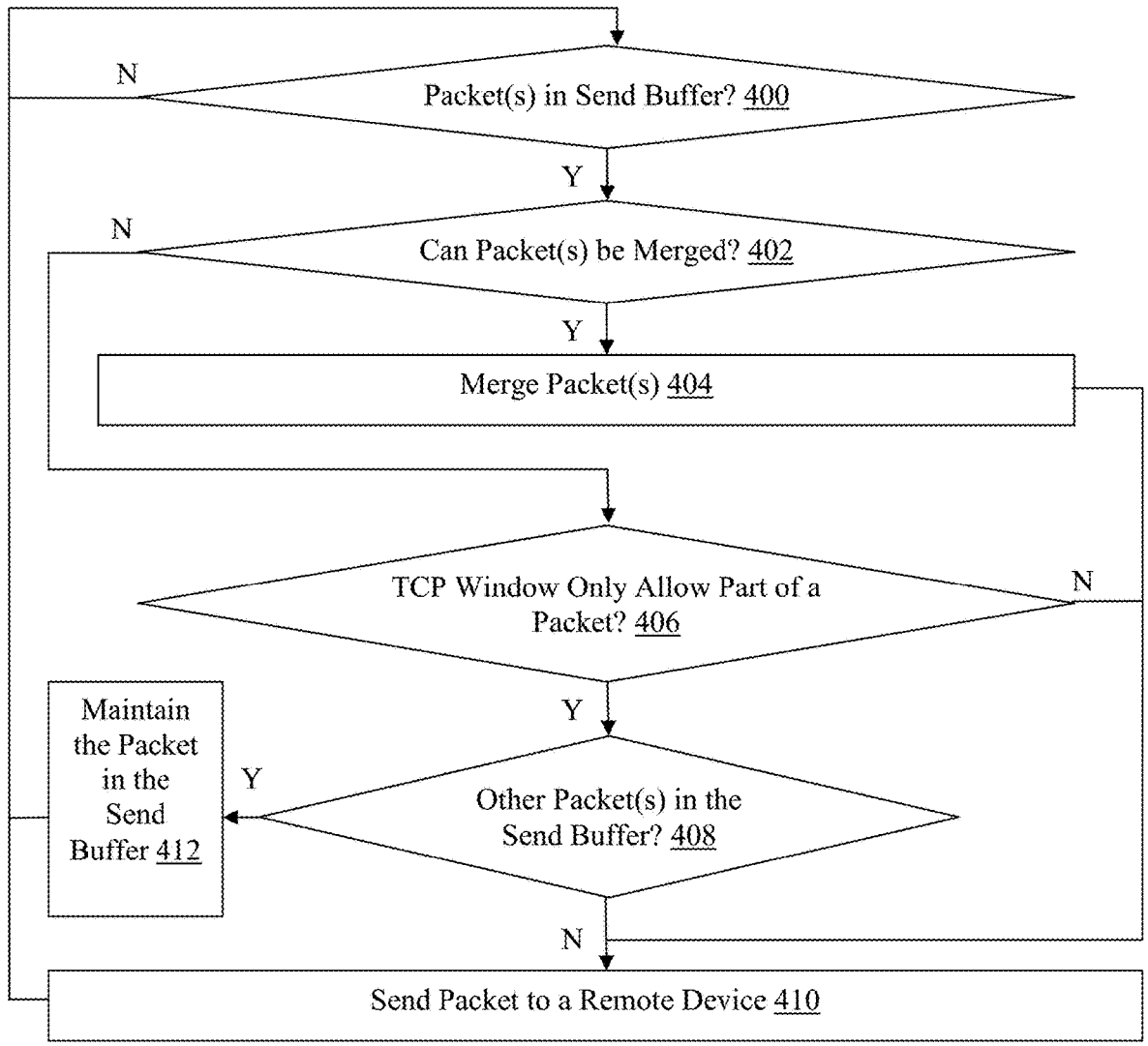
FIG. 4 is a flowchart of an exemplary method for packetizing data for a TCP connection when utilization of Nagle's algorithm is disabled.

Referring more specifically to FIG. 4, an example of a method of packetizing data for a TCP connection when utilization of Nagle's algorithm is disabled is illustrated. In step 400 in this example, the network traffic management apparatus 12 of the network traffic management system 10 determines whether there are any packet(s) in a send buffer in the memory 22.

In this particular example, the network traffic management apparatus 12 is acting as a proxy and, accordingly, incoming data (e.g., from the server devices 14(1)-14(n)) is packetized resulting in packetized data in the send buffers prior to transmission (e.g., to the client devices 16(1)-16(n)). If the network traffic management apparatus 12 determines that there are not any packet(s) in the send buffer, then the No branch is taken back to step 400, and the network traffic management apparatus 12 effectively waits for packet(s) to be received in the send buffer. However, if the network traffic management apparatus 12 determines that there are packet(s) in the send buffer, then the Yes branch is taken to step 402.

In step 402, the network traffic management apparatus 12 determines whether two or more of the packet(s) in the send buffer can be merged to generate one or more fewer packets. Whether packets can be merged may be based on whether there is more than one packet in the send buffer and/or a size of the packets as compared to a maximum segment size (MSS) for the TCP connection, for example, although other parameters can be used in other examples to determine whether two or more packets can be merged. If the network traffic management apparatus 12 determines that two or more packets in the send buffer can be merged, then the Yes branch is taken to step 404.

In step 404, the network traffic management apparatus 12 merges the two or more of the packets to generate one or more fewer packets. Thereby, application data from two or more packets will be sent with a same header. Accordingly, while utilization of Nagle's algorithm is disabled for the TCP connection, the network traffic management apparatus 12 advantageously aggregates packets when possible in order to reduce overall bandwidth utilization and the number of transmitted packets. However, if the network traffic management apparatus 12 determines in step 402 that two or more packets cannot be merged, then the No branch is taken to step 406.

In step 406, the network traffic management apparatus 12 determines whether a TCP window for the TCP connection will only allow part of one of the packets in the send buffer to be transmitted. If the network traffic management apparatus 12 determines that the TCP window will only allow part of a packet to be transmitted, then the Yes branch is taken to step 408.

In step 408, the network traffic management apparatus 12 determines whether there are other packet(s) in the send buffer. Subsequent to merging the packet(s) in step 404, or if the network traffic management apparatus 12 determines in step 408 that there are no other packets in the send buffer and the No branch is taken, then the network traffic management apparatus 12 proceeds to step 410.

In step 410, the network traffic management apparatus 12 sends a packet to a remote device, such as one of the client devices 16(1)-16(n), for example. The packet can be a merged packet generated in step 404. In another example, the packet could be a complete packet, as retrieved from the send buffer, which is capable of being sent within the current TCP window. In yet another example, the packet is the last packet received from a higher network protocol layer in the network stack 30 and, accordingly, the packet can be split because it will not be possible to merge the packet. Accordingly, in this example, the packet sent in step 410 is a split or partial packet based on the availability within the TCP window. However, if the network traffic management apparatus 12 determines in step 408 that there is at least one other packet in the send buffer, then the Yes branch is taken to step 412.

In step 412, the network traffic management apparatus 12 maintains the packet a portion of which would have been allowed within the TCP window rather than sending the split or partial packet in step 410. By maintaining the packet in the send buffer, the packet will be available to be merged in step 404 and the network traffic management apparatus 12 can reduce the overall number of transmitted packets. In particular, this technology can guarantee that the number of packets transmitted to the client devices 16(1)-16(n) will not exceed the number of packets received from the server devices 14(1)-14(n).

Accordingly, with this technology, utilization of Nagle's algorithm for TCP connections can be toggled dynamically and automatically based on a monitoring of the TCP connections. This technology optimizes the application of Nagle's algorithm for particular TCP connections, which may share particular characteristics or be associated with a particular application, and may benefit from enabling or disabling the algorithm. Advantageously, latency can be reduced, bandwidth can be more efficiently utilized, and fewer packets can be transmitted in network environments.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for transmission control protocol (TCP) connections, the method implemented by a network traffic management system comprising one or more network traffic management devices, server devices, or client devices, the method comprising:
    monitoring a TCP connection to determine when a network protocol layer configured to communicate with a TCP layer managing the TCP connection communicates an end of exchange message that indicates an end of an exchange of application data between the network protocol layer and the TCP layer;
    determining when a message associated with the TCP connection and received from a network protocol layer is an end of exchange message;
    responsive to the determination the message is the end of exchange message, determining when utilization of Nagle's algorithm for the TCP connection is disabled; and
    responsive to the determination that the utilization of Nagle's algorithm is disabled, enabling utilization of Nagle's algorithm for the TCP connection.

2. The method of claim 1, wherein the network protocol layer is in a same network stack as the TCP layer.

3. The method of claim 1, further comprising, when the message indicates an exchange of application data from the network protocol layer to the TCP layer is continuing:
    determining when a TCP acknowledgement delay is enabled at a remote device associated with the TCP connection based on a sequence number of one or more acknowledgement packets received from the remote device;
    determining when utilization of Nagle's algorithm for the TCP connection is disabled, when the TCP acknowledgement delay is enabled at the remote device; and
    disabling utilization of Nagle's algorithm for the TCP connection, when utilization of Nagle's algorithm for the TCP connection is enabled.

4. The method of claim 1, further comprising, when indicates an exchange of application data from the network protocol layer to the TCP layer is continuing:
    generating a round trip time (RTT) for one or more packets associated with the TCP connection;
    determining when the RTT exceeds a threshold RTT;
    determining when utilization of Nagle's algorithm for the TCP connection is disabled, when the RTT exceeds the threshold RTT; and
    enabling utilization of Nagle's algorithm for the TCP connection, when the the RTT exceeds the threshold RTT.

5. The method of claim 1, further comprising, after disabling utilization of Nagle's algorithm for the TCP connection:
- determining when one or more packets in a send buffer can be merged and merging the packets and sending the merged packets to a remote device associated with the TCP connection, when the packets can be merged;
- determining when a TCP window associated with the TCP connection will allow only part of one of the packets to be sent, when the packets are unable to be merged, and sending the one of the packets to the remote device, when the TCP window will allow all of the one of the packets to be sent; and
- determining when there is at least one other packet in the send buffer, when the TCP window will allow only part of the one of the packets to be sent, sending the part of the one of the packets to the remote device, when there is an absence of at least one other packet in the send buffer, and maintaining the part of the one of the packets in the send buffer, when there is at least one other packet in the send buffer.

6. A network traffic management apparatus, comprising a memory comprising programmed instructions stored thereon and one or more processors configured to be capable of executing the stored programmed instructions to:
- monitor a TCP connection to determine when a network protocol layer configured to communicate with a TCP layer managing the TCP connection communicates an end of exchange message that indicates an end of an exchange of application data between the network protocol layer and the TCP layer;
  - determine when at least one message associated with the TCP connection and received from a network protocol layer is an end of exchange message;
  - responsive to the determination the message is an end of exchange message, determine whether utilization of Nagle's algorithm for the TCP connection is disabled; and
  - responsive to the determination that the utilization of Nagle's algorithm is disabled, enable utilization of Nagle's algorithm for the TCP connection.

7. The network traffic management apparatus of claim 6, wherein the network protocol layer is in a same network stack as the TCP layer.

8. The network traffic management apparatus of claim 6, wherein the processors are further configured to be capable of executing the stored programmed instructions to, when indicates an exchange of application data from the network protocol layer to the TCP layer is continuing:
- determine when a TCP acknowledgement delay is enabled at a remote device associated with the TCP connection based on a sequence number of one or more acknowledgement packets received from the remote device;
- determine when utilization of Nagle's algorithm for the TCP connection is disabled, when the TCP acknowledgement delay is enabled at the remote device; and
- disable utilization of Nagle's algorithm for the TCP connection, when utilization of Nagle's algorithm for the TCP connection is enabled.

9. The network traffic management apparatus of claim 6, wherein the processors are further configured to be capable of executing the stored programmed instructions to, when the message indicates an exchange of application data from the network protocol layer to the TCP layer is continuing:
- generate a round trip time (RTT) for one or more packets associated with the TCP connection;
- determine when the RTT exceeds a threshold RTT;
- determine when utilization of Nagle's algorithm for the TCP connection is disabled, when the RTT exceeds the threshold RTT; and
- enable utilization of Nagle's algorithm for the TCP connection, when the RTT exceeds the threshold RTT.

10. The network traffic management apparatus of claim 6, wherein the processors are further configured to be capable of executing the stored programmed instructions to, after disabling utilization of Nagle's algorithm for the TCP connection:
- determine when one or more packets in a send buffer can be merged and merge the packets and send the merged packets to a remote device associated with the TCP connection, when the packets can be merged;
- determine when a TCP window associated with the TCP connection will allow only part of one of the packets to be sent, when the packets are unable to be merged, and send the one of the packets to the remote device, when the TCP window will allow all of the one of the packets to be sent; and
- determine when there is at least one other packet in the send buffer, when the TCP window will allow only part of the one of the packets to be sent, send the part of the one of the packets to the remote device, when there is an absence of at least one other packet in the send buffer, and maintain the part of the one of the packets in the send buffer, when there is at least one other packet in the send buffer.

11. A non-transitory computer readable medium having stored thereon instructions for managing transmission control protocol (TCP) connections comprising executable code which when executed by one or more processors, causes the processors to:
- monitor a TCP connection to determine when a network protocol layer configured to communicate with a TCP layer managing the TCP connection communicates an end of exchange message that indicates an end of an exchange of application data between the network protocol layer and the TCP layer;
- determine when at least one message associated with the TCP connection and received from a network protocol layer is an end of exchange message;
- responsive to the determination the message is an end of exchange message, determine whether utilization of Nagle's algorithm for the TCP connection is disabled; and
- responsive to the determination that the utilization of Nagle's algorithm is disabled, enable utilization of Nagle's algorithm for the TCP connection.

12. The non-transitory computer readable medium of claim 11, wherein the network protocol layer is in a same network stack as the TCP layer.

13. The non-transitory computer readable medium of claim 11, wherein the executable code when executed by the processors further causes the processors to, when the message indicates an exchange of application data from the network protocol layer to the TCP layer is continuing:
- determine when a TCP acknowledgement delay is enabled at a remote device associated with the TCP connection based on a sequence number of one or more acknowledgement packets received from the remote device;
- determine when utilization of Nagle's algorithm for the TCP connection is disabled, when the TCP acknowledgement delay is enabled at the remote device; and
- disable utilization of Nagle's algorithm for the TCP connection, when utilization of Nagle's algorithm for the TCP connection is enabled.

14. The non-transitory computer readable medium of claim 11, wherein the executable code when executed by the processors further causes the processors to, when the message indicates an exchange of application data from the network protocol layer to the TCP layer is continuing:
  generate a round trip time (RTT) for one or more packets associated with the TCP connection;
  determine when the RTT exceeds a threshold RTT;
  determine when utilization of Nagle's algorithm for the TCP connection is disabled, when the RTT exceeds the threshold RTT; and
  enable utilization of Nagle's algorithm for the TCP connection, when the RTT exceeds the threshold RTT.

15. The non-transitory computer readable medium of claim 11, wherein the executable code when executed by the processors further causes the processors to, after disabling utilization of Nagle's algorithm for the TCP connection:
  determine when one or more packets in a send buffer can be merged and merge the packets and send the merged packets to a remote device associated with the TCP connection, when the packets can be merged;
  determine when a TCP window associated with the TCP connection will allow only part of one of the packets to be sent, when the packets are unable to be merged, and send the one of the packets to the remote device, when—the TCP window will allow all of the one of the packets to be sent; and
  determine when there is at least one other packet in the send buffer, when the TCP window will allow only part of the one of the packets to be sent, send the part of the one of the packets to the remote device, when there is an absence of at least one other packet in the send buffer, and maintain the part of the one of the packets in the send buffer, when there is at least one other packet in the send buffer.

16. A network traffic management system, comprising one or more network traffic management devices, server devices, or client devices with memory comprising programmed instructions stored thereon and one or more processors configured to be capable of executing the stored programmed instructions to:
  monitor a TCP connection to determine when a network protocol layer configured to communicate with a TCP layer managing the TCP connection communicates an end of exchange message that indicates an end of an exchange of application data between the network protocol layer and the TCP layer; when at least one message associated with the TCP connection and received from a network protocol layer;
  determine when at least one message associated with the TCP connection and received from a network protocol layer is an end of exchange message;
  responsive to the determination the message is an end of exchange message, determine whether utilization of Nagle's algorithm for the TCP connection is disabled; and
  responsive to the determination that the utilization of Nagle's algorithm is disabled, enable utilization of Nagle's algorithm for the TCP connection.

17. The network traffic management system of claim 16, wherein the network protocol layer is in a same network stack as the TCP layer.

18. The network traffic management system of claim 16, wherein the processors are further configured to be capable of executing the stored programmed instructions to, when the message indicates an exchange of application data from the network protocol layer to the TCP layer is continuing:
  determine when a TCP acknowledgement delay is enabled at a remote device associated with the TCP connection based on a sequence number of one or more acknowledgement packets received from the remote device;
  determine when utilization of Nagle's algorithm for the TCP connection is disabled, when the TCP acknowledgement delay is enabled at the remote device; and
  disable utilization of Nagle's algorithm for the TCP connection, when utilization of Nagle's algorithm for the TCP connection is enabled.

19. The network traffic management system of claim 16, wherein the processors are further configured to be capable of executing the stored programmed instructions to, when the message indicates an exchange of application data from the network protocol layer to the TCP layer is continuing:
  generate a round trip time (RTT) for one or more packets associated with the TCP connection;
  determine when the RTT exceeds a threshold RTT;
  determine when utilization of Nagle's algorithm for the TCP connection is disabled, when the RTT exceeds the threshold RTT; and
  enable utilization of Nagle's algorithm for the TCP connection, when the RTT exceeds the threshold RTT.

20. The network traffic management system of claim 16, wherein the processors are further configured to be capable of executing the stored programmed instructions to, after disabling utilization of Nagle's algorithm for the TCP connection:
  determine when one or more packets in a send buffer can be merged and merge the packets and send the merged packets to a remote device associated with the TCP connection, when the packets can be merged;
  determine when a TCP window associated with the TCP connection will allow only part of one of the packets to be sent, when the packets are unable to be merged, and send the one of the packets to the remote device, when the TCP window will allow all of the one of the packets to be sent; and
  determine when there is at least one other packet in the send buffer, when the TCP window will allow only part of the one of the packets to be sent, send the part of the one of the packets to the remote device, when there is an absence of at least one other packet in the send buffer, and maintain the part of the one of the packets in the send buffer, when there is at least one other packet in the send buffer.

* * * * *